(12) United States Patent
Schermer

(10) Patent No.: US 9,051,962 B2
(45) Date of Patent: Jun. 9, 2015

(54) FASTENER

(71) Applicant: Peter J. Schermer, Los Angeles, CA (US)

(72) Inventor: Peter J. Schermer, Los Angeles, CA (US)

(73) Assignee: Amcor Industries, Inc., Los Angeles, CA (US)

( * ) Notice: Subject to any disclaimer, the term of this patent is extended or adjusted under 35 U.S.C. 154(b) by 0 days.

(21) Appl. No.: 14/070,403

(22) Filed: Nov. 1, 2013

(65) Prior Publication Data

US 2014/0205396 A1    Jul. 24, 2014

(51) Int. Cl.
*F16B 37/00* (2006.01)
*F16B 41/00* (2006.01)

(52) U.S. Cl.
CPC .................... *F16B 41/005* (2013.01)

(58) Field of Classification Search
USPC ................ 411/427, 429, 432, 910
See application file for complete search history.

(56) References Cited

U.S. PATENT DOCUMENTS

| | | | | |
|---|---|---|---|---|
| 3,930,428 | A * | 1/1976 | Hale | 81/124.6 |
| 4,693,655 | A * | 9/1987 | Omori | 411/429 |
| 4,869,633 | A | 9/1989 | Hayashi | |
| RE33,114 | E * | 11/1989 | Chiavon | 81/121.1 |
| 4,897,008 | A * | 1/1990 | Parks | 411/432 |
| 5,219,255 | A * | 6/1993 | Hussain et al. | 411/432 |
| 5,302,069 | A * | 4/1994 | Toth et al. | 411/429 |
| 5,324,149 | A | 6/1994 | Bainbridge et al. | |
| 5,350,266 | A * | 9/1994 | Espey et al. | 411/431 |
| 5,380,070 | A | 1/1995 | Fitzgerald | |
| 5,803,690 | A * | 9/1998 | Savinsky | 411/432 |
| 6,039,408 | A | 3/2000 | Alvarez | |
| 6,039,524 | A | 3/2000 | McKinlay | |
| 6,318,942 | B1 * | 11/2001 | Wieczorek | 411/431 |
| 6,719,511 | B2 * | 4/2004 | Notaro et al. | 411/431 |
| 7,392,674 | B1 | 7/2008 | Grote | |
| 2002/0110436 | A1 | 8/2002 | Nance et al. | |
| 2003/0165371 | A1 | 9/2003 | Notaro et al. | |
| 2005/0084363 | A1 * | 4/2005 | Somers et al. | 411/429 |
| 2006/0228191 | A1 | 10/2006 | Ward | |
| 2008/0193259 | A1 | 8/2008 | Hill | |
| 2009/0067948 | A1 * | 3/2009 | Chung | 411/429 |
| 2012/0263558 | A1 | 10/2012 | Swanson | |

OTHER PUBLICATIONS

Search Report and Written Opinion for PCT Application No. PCT/US13/68157 dated Apr. 8, 2014.

\* cited by examiner

*Primary Examiner* — Roberta Delisle
(74) *Attorney, Agent, or Firm* — Sheppard Mullin Richter & Hampton, LLP

(57) ABSTRACT

A fastener for securing a wheel rim to a wheel hub having a screw connecting element, includes a fastener body and a rotatable upper stage lock element. The fastener body is configured to be screwed to the screw connecting element of the wheel hub and includes a coupling section and a flange section located at one end of the coupling section. The flange section includes an outer circumferential surface and a first positioning portion formed at the outer circumferential surface. The rotatable upper stage lock element includes a peripheral wall configured to rotatably mount on the flange section of the fastener body. A plurality of annularly spaced first and second grooves are formed in the coupling section and in an outer peripheral surface of the peripheral wall, respectively, so that a plurality of the first and second grooves can be aligned to define a key receiving surface by rotating the rotatable upper stage lock element. The design has good anti-theft effects.

8 Claims, 9 Drawing Sheets

FASTENER

CROSS-REFERENCE TO RELATED APPLICATIONS

This application claims priority to Taiwanese Patent Application No. 102201377 filed on Jan. 22, 2013, the entire disclosure of which is incorporated herein by reference.

TECHNICAL FIELD

The present invention relates generally to fasteners, and more particularly, to a fastener for fastening a wheel rim to a wheel hub.

BACKGROUND

In general, a wheel rim is fastened to a wheel hub by a plurality of fasteners, such as bolts and nuts. Currently, the fastener head raised above the wheel rim can be generally categorized into two types. The first type has a hexagonal cross sectional head, and can be fastened or unfastened by tools like hex wrenches and hexagon sockets. The second type has specially-shaped head that can only be fastened or unfastened using specially designed tools, thus having anti-theft effects.

However, once the above fasteners are loosened, they can be easily unfastened. Thus, there is a need to further improve the anti-theft effects.

SUMMARY OF THE INVENTION

It is therefore an objective of the present invention to provide a fastener with good anti-theft effects.

In accordance with embodiments of the present invention, a fastener is provided for fastening a wheel rim to a wheel hub, wherein the wheel hub includes a screw connecting element, and the fastener includes a fastener body and a rotatable upper stage lock element.

The fastener body is configured to be screwed to the screw connecting element, and includes a coupling section and a flange section located at one end of the coupling section. The flange section includes an outer circumferential surface and a first positioning portion formed at the outer circumferential surface. The rotatable upper stage lock element includes a peripheral wall configured to rotatably mount on the flange section of the fastener body. The peripheral wall includes an inner peripheral surface and a second positioning portion formed at the inner peripheral surface and configured to rotatably couple the rotatable upper stage lock element to the first positioning portion of the flange section of the fastener body.

The first positioning portion may be, for example, one of an annular rib and an annular groove, and the second positioning portion may be the other one of the annular rib and the annular groove.

In one embodiment, a plurality of annularly spaced first grooves are formed on the coupling section; a plurality of annularly spaced second grooves are formed on an outer peripheral surface of the peripheral wall; at least a portion of the second grooves have the same annular spacing as at least a portion of the first grooves so that each of the at least a portion of the plurality of second grooves corresponds to one of the plurality of the first grooves, and so that a plurality of the second grooves can be aligned with a plurality of the first grooves to define a key receiving surface by rotating the rotatable upper stage lock element.

In another embodiment, a plurality of annularly spaced first grooves are formed in the coupling section; a plurality of annularly spaced second grooves are formed on an outer peripheral surface of the peripheral wall; the number of the plurality of first grooves is equal to the number of the plurality of second grooves; and each of the plurality of first grooves corresponds in annular spacing to one of the plurality of second grooves so that the plurality of second grooves can be aligned with the plurality of first grooves to define a key receiving surface by rotating the rotatable upper stage lock element.

In still another embodiment, a plurality of annularly spaced first grooves are formed in the coupling section; a plurality of annularly spaced second grooves are formed on an outer peripheral surface of the peripheral wall; the number of the plurality of first grooves is smaller than the number of the plurality of second grooves; and each of the plurality of first grooves corresponds in annular spacing to one of the plurality of second grooves so that a plurality of the second grooves can be aligned with the plurality of the first grooves to define a key receiving surface by rotating the rotatable upper stage lock element.

The screw connecting element may be a stud, and the fastener body may have a form of a nut that includes a screw hole for the stud to be screwed into.

Alternatively, the screw connecting element may be a screw hole, and the fastener body may have a form of a screw bolt that includes a threaded stud for screwing into the screw hole.

In accordance with embodiments of the present invention, the rotatable upper stage lock element of the fastener is rotatably mounted on the flange section of the fastener body, and is designed to be raised above the wheel rim. Thus, when being turned using a conventional wrench, the rotatable upper stage lock element will only turn relative to the fastener body, and will not drive the fastener body to rotate therewith, thus enabling the fastener body to remain firmly screwed into the corresponding screw connecting element and preventing the wheel rim as well as the tire mounted thereon from being easily stolen.

BRIEF DESCRIPTION OF THE DRAWINGS

The advantages and features of the present invention will be better understood in view of the following detailed description in conjunction with the drawings.

DETAILED DESCRIPTION OF THE DRAWINGS

Figure 1:
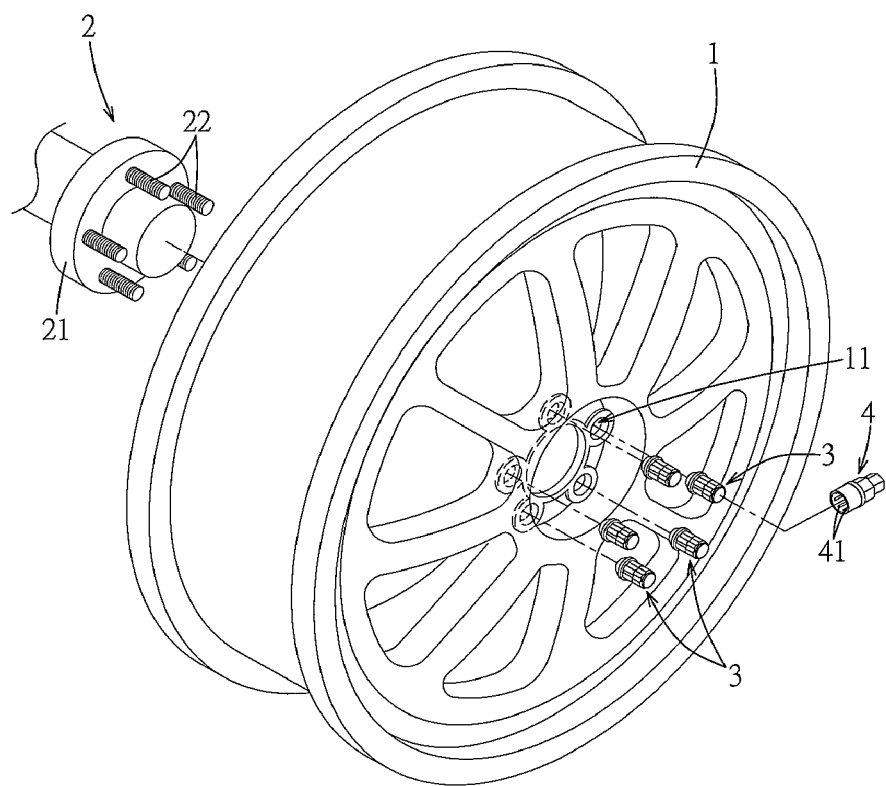
FIG. 1 is a schematic diagram illustrating a perspective view of a fastener being used to mount a wheel rim to a wheel hub in accordance with a first embodiment of the present invention.

Before the present invention is described in detail, it should be noted that similar elements are denoted by the same reference numerals in the following description of the preferred embodiments.

Figure 2:
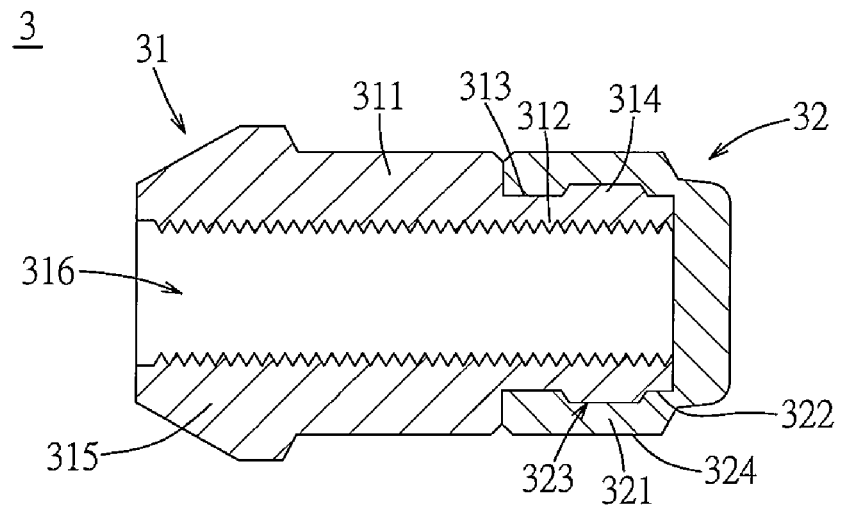
FIG. 2 is a schematic diagram illustrating a cross-sectional view of a fastener body and a rotatable upper stage lock element assembled together in accordance with the first embodiment of the present invention, wherein a first positioning portion is an annular rib and a second positioning portion is an annular groove.
Figure 3:
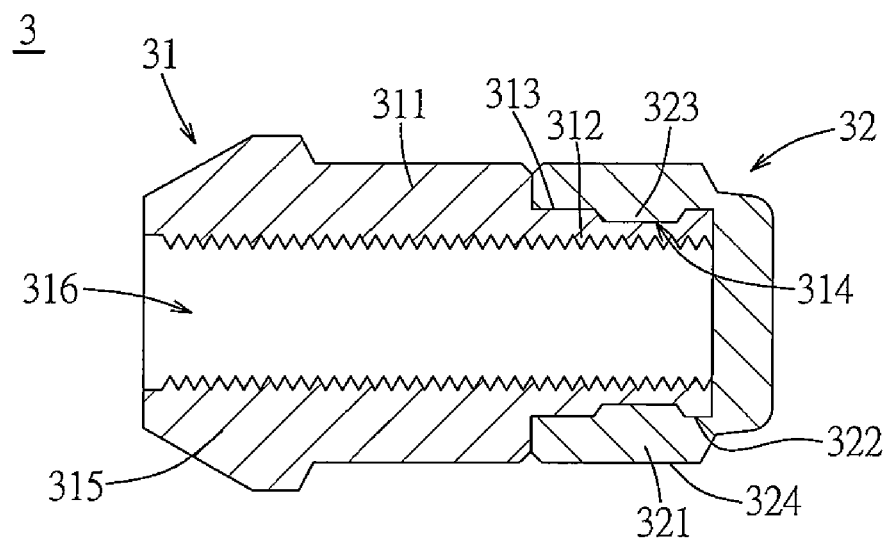
FIG. 3 is a schematic diagram illustrating a cross-sectional view of an alternative implementation of the fastener in accordance with the first embodiment of the present invention, wherein the first positioning portion is an annular groove and the second positioning portion is an annular rib.

Referring to FIGS. 1 and 2, in a first preferred embodiment of the present invention, a plurality of fasteners 3 are used to secure a wheel rim 1 to a wheel hub 2. The wheel hub 2 includes a hub flange 21 and a plurality of screw connecting elements 22 on the hub flange 21. The fastener 3 includes a fastener body 31 and a rotatable upper stage lock element 32.

The fastener body 31 of the fastener 3 can be screwed to a corresponding screw connecting element 22 and includes a coupling section 311 and a flange section 312 located at one end of the coupling section 311. The flange section 312 includes an outer circumferential surface 313 and a first positioning portion 314 formed on the outer circumferential surface 313. The rotatable upper stage lock element 32 includes a peripheral wall 321 configured to rotatably mount on the flange section 312. The peripheral wall includes an inner peripheral surface 322 and a second positioning portion 323 which is formed in the inner peripheral surface 322 and configured to rotatably couple the rotatable upper stage lock element 32 to the first positioning portion 314 of the flange section 312 of the fastener body 31. When the fastener 3 is in use, the rotatable upper stage lock element 32 rotatably mounts on the flange section 312 of the fastener body 31 and is raised above the wheel rim 1. Thus, when being turned using a conventional wrench, the rotatable upper stage lock element 32 will only turn relative to the fastener body 31, and will not drive the fastener body 31 to rotate therewith, thus enabling the fastener body 31 to remain firmly screwed into the corresponding screw connecting element 22. The fastener body 31 can only be loosened and unfastened from the screw connecting element 22 by a specially designed tool 4 comprising a key for fastener 3. As such, the wheel rim 1 as well as the tire (not shown in the figures) mounted on the wheel rim 1 can be prevented from being easily stolen.

In this embodiment, each of the plurality of screw connecting elements 22 of the wheel hub 2 comprises a stud screwed into the hub flange 21, and the fastener body 31 of the fastener 3 has the form of a nut. The fastener body 31 further includes a pushing section 315 located at the opposite end of the coupling section 311 to the flange section 312 and that is pushed against the hub flange 21. The coupling section 311, the flange section 312 and the pushing section 315 together define a screw hole 316 for the corresponding screw connecting element 22 to be screwed into. In this embodiment, the first positioning portion 314 of the flange section 312 is an annular rib that radially extends outwardly on the outer circumferential surface 313, whilst the second positioning portion 323 of the peripheral wall 321 is an annular groove forming a radial recess that extends outwardly in the inner peripheral surface 322 and that accommodates the annular rib of the first positioning portion 314. As such, the rotatable upper stage lock element 32 can rotate about the flange section 312 at a fixed position without departing therefrom.

It should be appreciated that the first positioning portion 314 of the flange section 312 may also be implemented as an annular groove forming a radial recess that extends inwardly in the outer circumferential surface 313 with the second positioning portion 323 of the peripheral wall 321 comprising an annular rib that radially extends inwardly on the inner peripheral surface 322, to achieve the above function, i.e., enabling the rotatable upper stage lock element 32 to rotate about the flange section 312 at a fixed position without departing therefrom.

Figure 4:
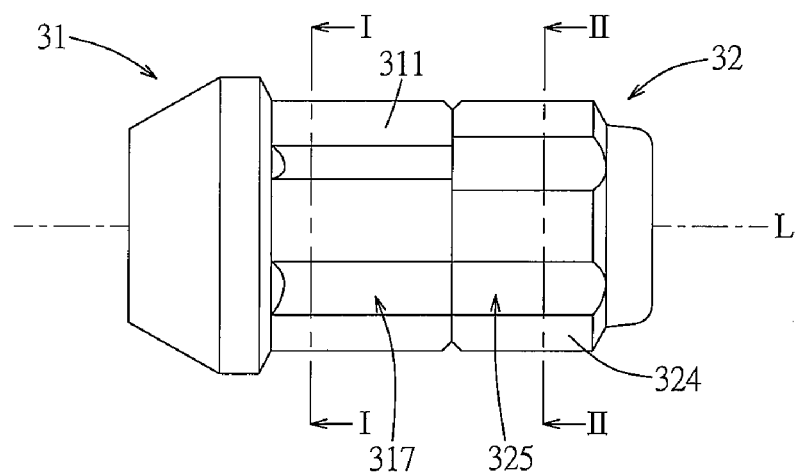
FIG. 4 is a schematic diagram illustrating a side view of the correspondence between first grooves of the coupling section and second grooves of the rotatable upper stage lock element in accordance with the first embodiment of the present invention.
Figure 5:
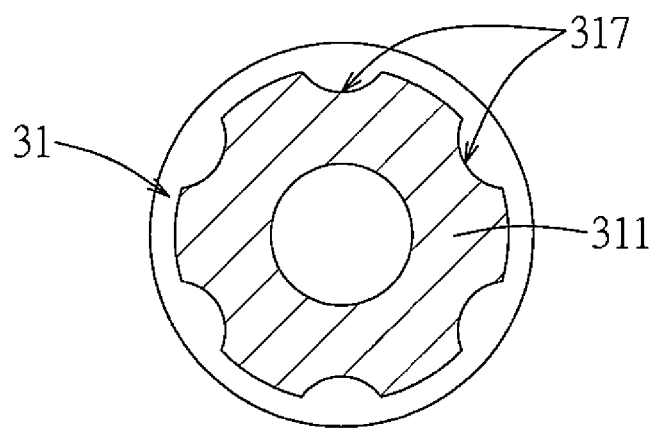
FIG. 5 is a schematic diagram illustrating a cross-sectional view of a plurality of first grooves formed on an outer circumferential surface of the coupling section in accordance with the first embodiment of the present invention.
Figure 6:
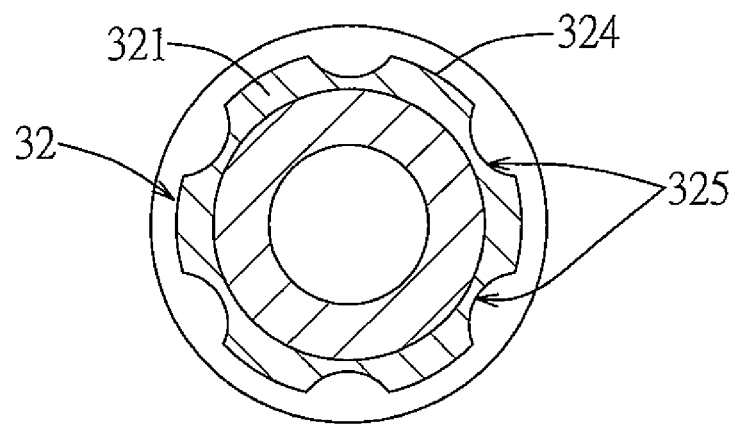
FIG. 6 is a schematic diagram illustrating a cross-sectional view of a plurality of second grooves formed on an outer peripheral surface of a peripheral wall of the rotatable upper stage lock element in accordance with the first embodiment of the present invention.

With further reference to FIGS. 4, 5 and 6, a plurality of annularly spaced longitudinal first grooves 317 are formed in an outer circumferential surface of the coupling section 311. Specifically, the first grooves 317 are annularly spaced from one another and located annularly around the coupling section 311. Preferably the annular spacing between each of the first grooves 317 is irregular. Correspondingly, the peripheral wall 321 of the rotatable upper stage lock element 32 includes an outer peripheral surface 324 having a plurality of second grooves 325 formed in the outer peripheral surface 324. Each of the plurality of first grooves 317 and second grooves 325 extend longitudinally along a center line L of the fastener body 31 and the rotatable upper stage lock element 32. In this embodiment, the number of the first grooves 317 is equal to the number of the second grooves 325, and each of the first grooves 317 corresponds in annular location to one of the second grooves 325 so that they can be aligned by rotating the rotatable upper stage lock element 32 to define a key receiving surface to receive a plurality of matching ribs 41 (as shown in FIG. 1) of the key 4. As such, to unfasten the fastener body 31 of the fastener 3 from the corresponding screw connecting element 22 of the wheel hub 2, one can couple the key 4, which has the shape of a cylinder, to both the fastener body 31 and the rotatable upper stage lock element 32, with the plurality of ribs 41 being coupled to the first and second grooves 317 and 325. The turning of the key 4 will thus drive both the fastener body 31 and the rotatable upper stage lock element 32 to rotate with the key 4 so as to unfasten the fastener 3 from the screw connecting element 22. The fastener body 31 of the fastener 3 can likewise be fastened to screw connecting element 22 by rotating key 4 in the opposite direction.

Figure 7:
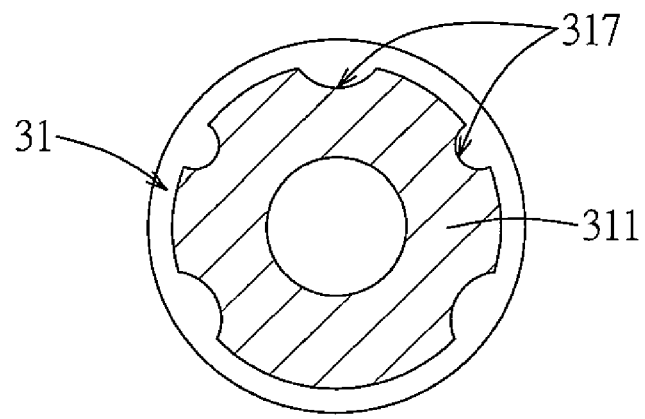
FIG. 7 is a schematic diagram illustrating a cross-sectional view of an alternative implementation of the coupling section of the fastener in accordance with the first embodiment of the present invention.
Figure 8:
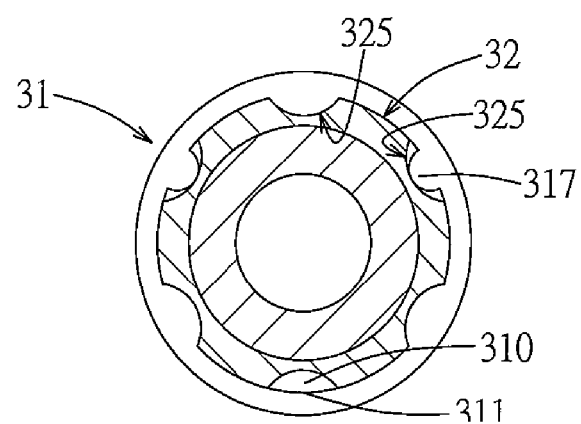
FIG. 8 is a schematic diagram illustrating a cross-sectional view of an alternative implementation of the fastener in accordance with the first embodiment of the present invention, wherein the number of the first grooves is smaller than the number of the second grooves.

With further reference to FIGS. 7, 8, and 1, the number of the first grooves 317 of the coupling section 311 of the fastener body 31 may preferably be, as shown in this embodiment, smaller than the number of the second grooves 325 of the rotatable upper stage lock element 32. However, at least a portion of the plurality of second grooves 325 have the same annular spacing as the plurality of first grooves 317 so that each of the at least a portion of the plurality of second grooves 325 corresponds to one of the plurality of first grooves 317, and a plurality of the second grooves 325 can be aligned with the plurality of the first grooves by rotating the rotatable upper stage lock element 32 to define a key receiving surface for receiving a plurality of matching ribs 41 of a tool 4 comprising a key. In this case, in order for the tool 4 to comprise a key for fastener 3 and thus to be able to drive both the fastener body 31 and the rotatable upper stage lock element 32 to move, the number of the ribs 41 of the tool 4 is preferably equal to the number of the first grooves 317, but at a minimum tool 4 should have at least two matching ribs 41 for being received by two corresponding first and second grooves 317, 325. In other words, in the present embodiment, not all of the second grooves 325 form part of the key receiving surface for a tool 4 that comprises the corresponding key for fastener 3. Preferably visual observation of the wheel rim 1 from outside can only reveal the shape of the rotatable upper stage lock element 32 of the fastener 3 and the number of the second grooves 325. Thus, when a thief wants to steel the wheel rim 1 and the tire mounted thereon, he can only use such information to choose a tool 4 that fits the rotatable upper stage lock element 32, which will drive it to rotate. While the thief can rotate the rotatable upper stage lock element 32 with a tool 4 having the same number of ribs as the second grooves 325, since the number of the first grooves 317 is smaller than the number of the second grooves 325, a proximal end surface 310 of the coupling section 311 will prevent the further insertion of the ribs 41 of the thief's tool 4. Thus, the thief's tool 4 cannot engage the coupling section 311 by coupling the ribs 41 to any of the first grooves 317. As a result, the fastener body 31 will remain screwed into the corresponding screw connecting element 22 and the fastener 3 achieves good anti-theft effects.

Figure 9:
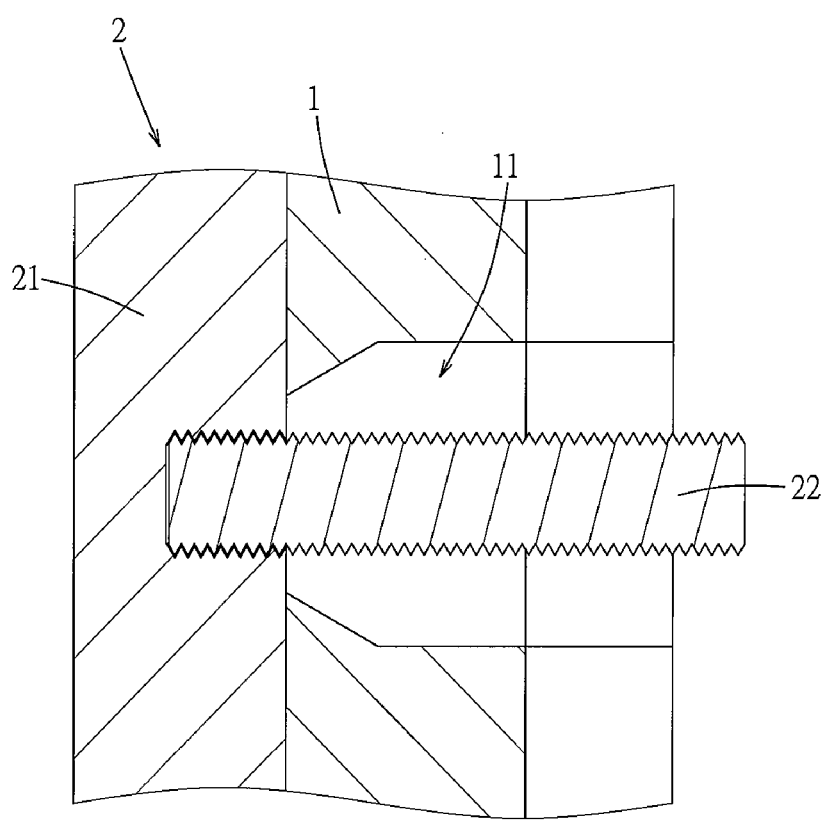
FIG. 9 is a schematic diagram illustrating a partial cross-sectional view of a screw connecting element of the wheel hub being inserted in a corresponding through hole of the wheel rim in accordance with the first embodiment of the present invention.
Figure 10:
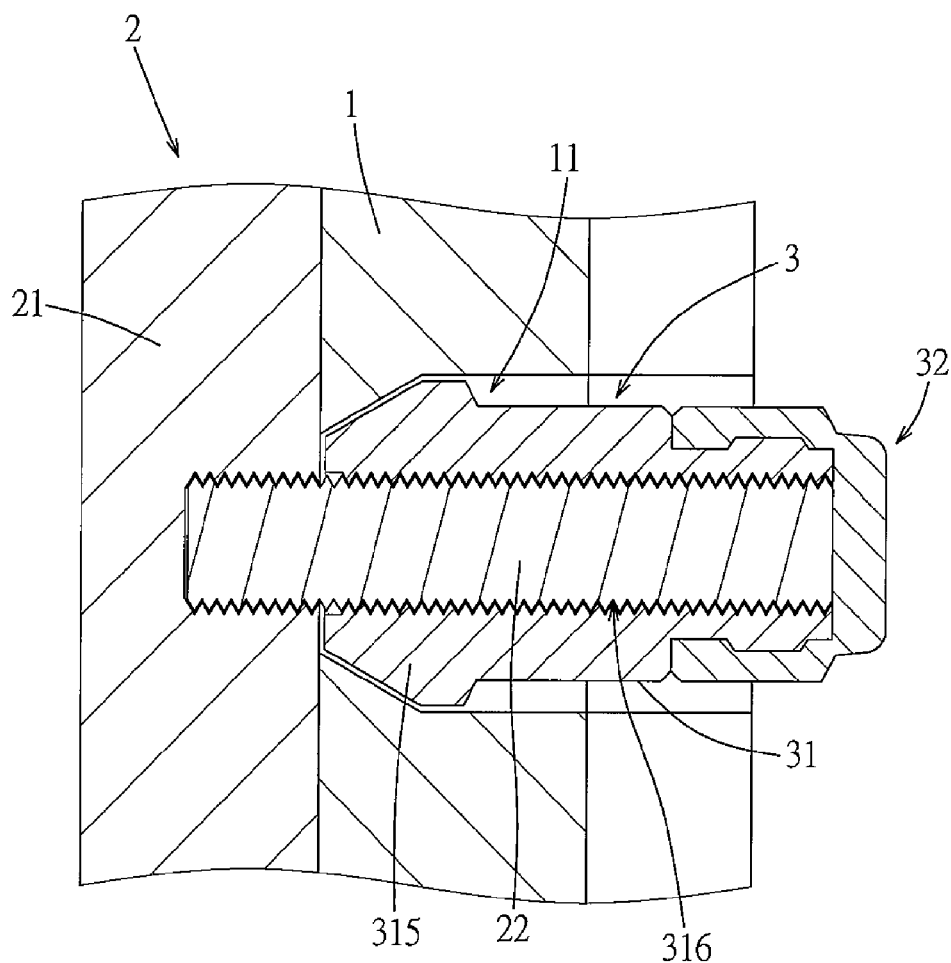
FIG. 10 is a schematic diagram illustrating a partial cross-sectional view of a screw hole being screwed to a corresponding screw connecting element of the wheel hub in accordance with the first embodiment of the present invention.

With further reference to FIGS. 9, 10 and 1, an individual can mount the wheel rim 1 on the wheel hub 2 in the following steps: aligning a plurality of through holes 11 of the wheel rim 1 with the plurality of screw connecting elements 22 of the wheel hub 2; laterally pushing the wheel rim 1 towards the wheel hub 2 to insert the screw connecting elements 22 into the through holes 11; and sequentially screwing a plurality of the fasteners 3 to the corresponding plurality of screw connecting elements 22 with the specially designed tool 4 comprising a key for fastener 3 to make sure each fastener 3 has its pushing section 314 pushed firmly against the wheel rim 1 so that the wheel rim 1 is in close contact with the hub flange 21 of the wheel hub 2.

As noted above, when the faster 3 is in use, the rotatable upper stage lock element 32 rotatably mounts on the flange section 312 of the fastener body 31 and is raised above the wheel rim 1. Thus, when being turned using a conventional wrench, the rotatable upper stage lock element 32 will only turn relative to the fastener body 31, and will not drive the fastener body 31 to rotate therewith, thus enabling the fastener body 31 to remain firmly screwed into the corresponding screw connecting element 22, and preventing the wheel rim 1 as well as the tire mounted on the wheel rim 1 from being easily stolen.

Similarly, an individual can unfasten the wheel rim 1 from the wheel hub 2 by following the following steps: removing each fastener 3 from the corresponding screw connecting element 22 by fitting the specially designed tool 4 comprising a key for fastener 3 around the fastener 3 with the ribs 41 of the tool 4 respectively received in the second grooves 325, rotating the rotatable upper stage lock element until the second grooves 325 are aligned with their corresponding first grooves 317, inserting the ribs 41 of the tool 4 into the first grooves 317 of the fastener 3, and rotating the fastener 3 in a reverse direction to the above; and laterally pulling the wheel rim 1 apart from the wheel hub 1 to allow the screw connecting element 22 to slide out of the through holes of the wheel hub 1.

Figure 11:
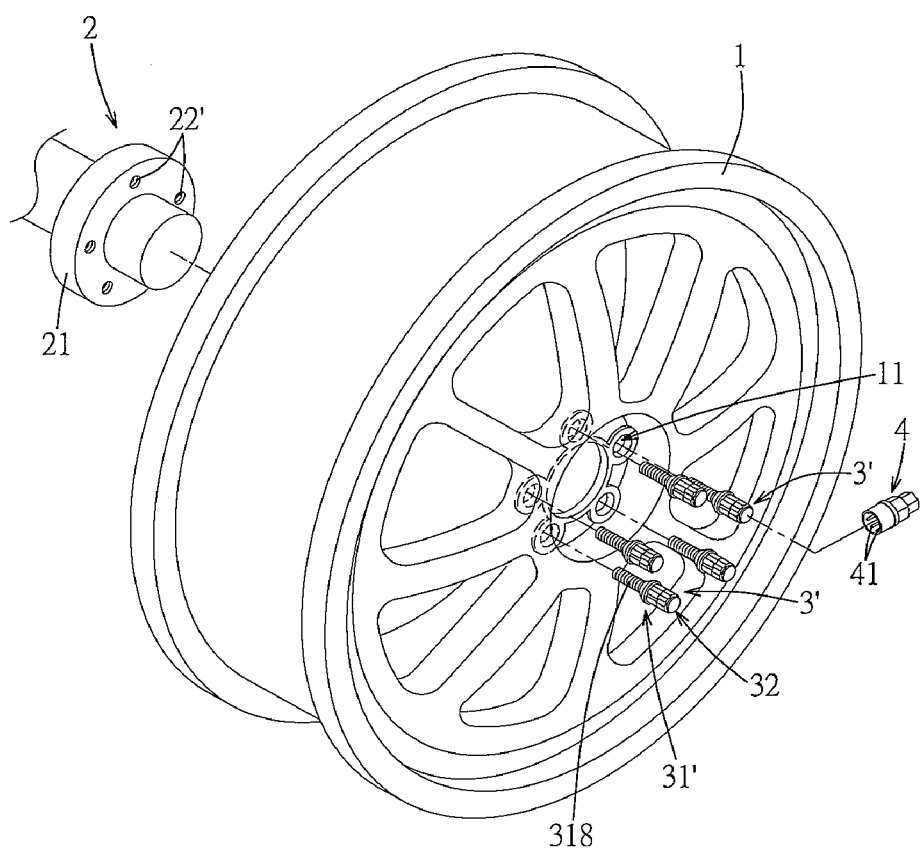
FIG. 11 is schematic diagram illustrating a perspective view of a fastener being used to mount the wheel rim to the wheel hub in accordance with a second embodiment of the present invention.
Figure 12:
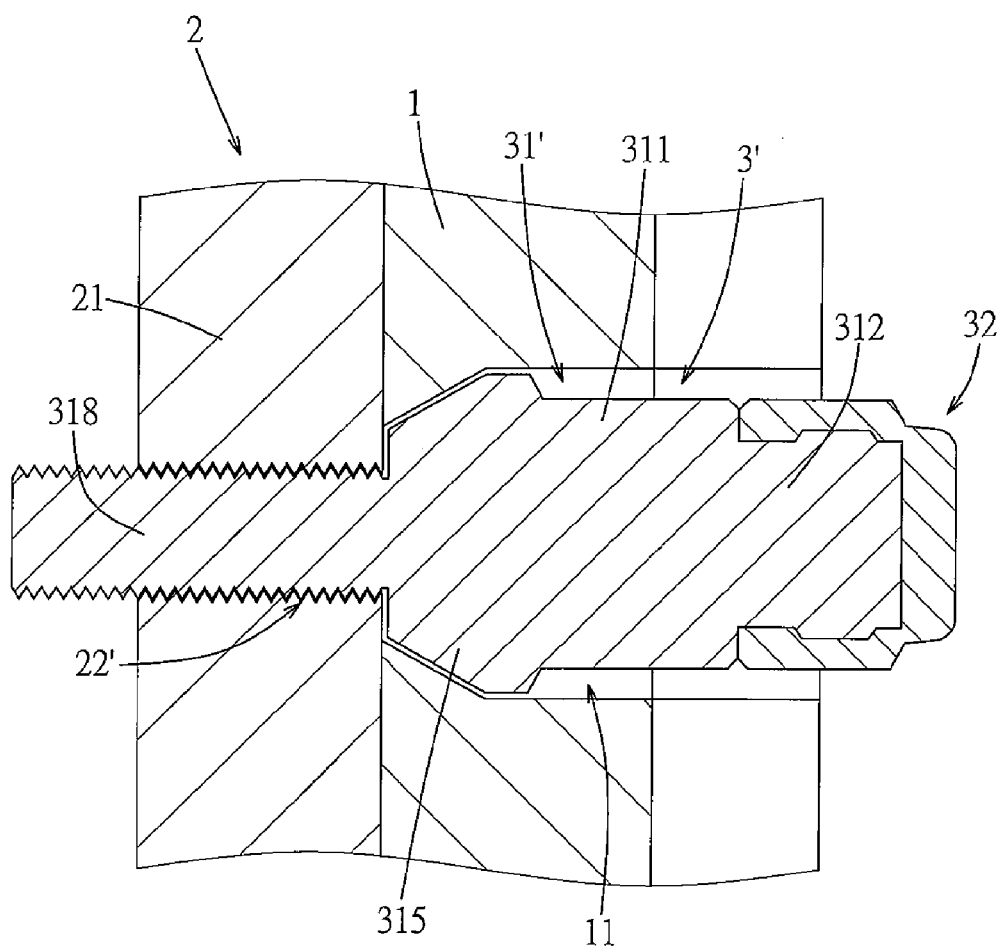
FIG. 12 is a schematic diagram illustrating a partial cross-sectional view of a stud of the fastener being secured to a corresponding screw connecting element of the wheel hub in accordance with the second embodiment of the present invention.

FIGS. 11 and 12 depict a fastener 3' constructed in accordance with a second preferred embodiment of the present invention. The fastener 3' can be secured and removed in the same way as the fastener 3 of the first preferred embodiment, but differs somehow in structure from the fastener 3 of the first preferred embodiment.

In the second preferred embodiment, each of the plurality of screw connecting elements 22' of the wheel hub 2 is a screwed hole, and the fastener body 31' of the fastener 3' has the form of a bolt. Additionally, the fastener body 31' further includes a stud 318' extending from the end of the pushing section 315 in a direction opposite from the coupling section 311 and configured to be screwed into a corresponding screw connecting element 22'.

As noted above, when the faster 3, 3' is in use, the rotatable upper stage lock element 32 rotatably mounts on the flange section 312 of the fastener body 31, 31' and is raised above the wheel rim 1. Thus, when being turned using a conventional wrench, the rotatable upper stage lock element 32 will only turn relative to the fastener body 31, 31', and will not drive the fastener body 31, 31' to rotate therewith, thus enabling the fastener body 31, 31' to remain firmly screwed into the corresponding screw connecting element 22, and preventing the wheel rim 1 as well as the tire mounted on the wheel rim 1 from being easily stolen.

Though the present invention has been described in connection with the exemplary embodiments, it should be understood that the present invention is not limited to those embodiments. All simple variations and modifications made in light of the above teachings without departing from the spirit of the invention are within the scope of the present invention.

| [BRIEF DESCRIPTION OF NUMERALS] | | | |
|---|---|---|---|
| 1 | Wheel Rim | 315 | Pushing Section |
| 11 | Through Holes | 316 | Screw Hole |
| 2 | Wheel Hub | 317 | First Grooves |
| 21 | Hub Flange | 318 | Stud |
| 22, 22' | Screw Connecting Elements | 32 | Rotatable upper stage lock element |
| 3, 3' | Fasteners | 321 | Peripheral Wall |
| 31, 31' | Fastener Body | 322 | Inner Peripheral Surface |
| 310 | End Surface | 323 | Second Positioning Portion |
| 311 | Coupling section | 324 | Outer Peripheral Surface |
| 312 | Flange Section | 325 | Second Grooves |
| 313 | Outer Circumferential Surface | L | Center Line |
| 314 | First Positioning Portion | | |

What is claimed is:

1. A fastener for fastening a wheel rim to a wheel hub, the wheel hub comprising a screw connecting element, the fastener comprising:

a fastener body configured to be screwed to the screw connecting element, the fastener body comprising a coupling section and a flange section located at one end of the coupling section, the flange section comprising an outer circumferential surface and a first positioning portion formed at the outer circumferential surface; and a rotatable upper stage lock element comprising a peripheral wall configured to rotatably mount on the flange section, the peripheral wall comprising an inner peripheral surface and a second positioning portion formed at the inner peripheral surface and configured to rotatably couple the rotatable upper stage lock element to the first positioning portion of the flange section of the fastener body; wherein a plurality of annularly spaced first grooves are formed in the coupling section;

the peripheral wall comprises an outer peripheral surface and a plurality of annularly spaced second grooves are formed in the outer peripheral surface of the peripheral wall.

2. The fastener of claim 1, wherein at least a portion of the second grooves have the same annular spacing as at least a portion of the first grooves so that each of the at least a portion of the second grooves corresponds to one of the plurality of the first grooves in annular spacing, and so that a plurality of the second grooves can be aligned with a plurality of the first grooves to define a key receiving surface by rotating the rotatable upper stage lock element.

3. The fastener of claim 2, wherein the first positioning portion is one of an annular rib and an annular groove, and the second positioning portion is the other one of the annular rib and the annular groove.

4. The fastener of claim 2, wherein the number of the plurality of first grooves is equal to the number of the plurality of second grooves, and each of the plurality of first grooves corresponds in annular spacing to one of the plurality of second grooves so that the plurality second grooves can be aligned to the plurality of first grooves to define a key receiving surface by rotating the rotatable upper stage lock element.

5. The fastener of claim 2, wherein the number of the plurality of first grooves is smaller than the number of the plurality of second grooves, and each of the plurality of first grooves corresponds in annular spacing to one of the plurality of second grooves so that a plurality of the second grooves can be aligned with the plurality of first grooves to define a key receiving surface by rotating the rotatable upper stage lock element.

6. The fastener of claim 2, wherein the screw connecting element is a stud, the fastener body has a form of a nut and comprises a screw hole for the stud to be screwed into.

7. The fastener of claim 2, wherein the screw connecting element is a screw hole, the fastener body has a form of a screw bolt that comprises a threaded stud for screwing into the screw hole.

8. The fastener of claim 2, wherein the annular spacing between at least some of the first grooves is irregular.

* * * * *